A. A. BALL, Jr.
FLUID PRESSURE ENGINE.
APPLICATION FILED JUNE 24, 1902.

996,900.

Patented July 4, 1911.
8 SHEETS—SHEET 7.

Witnesses:
Benjamin B. Hull
Helen Oxford

Inventor,
Augustus A. Ball Jr.,
By Albert G. Davis
Att'y.

UNITED STATES PATENT OFFICE.

AUGUSTUS A. BALL, JR., OF LYNN, MASSACHUSETTS, ASSIGNOR, BY MESNE ASSIGNMENTS, TO GENERAL ELECTRIC COMPANY, A CORPORATION OF NEW YORK.

FLUID-PRESSURE ENGINE.

996,900.  Specification of Letters Patent.  Patented July 4, 1911.

Application filed June 24, 1902. Serial No. 113,039.

*To all whom it may concern:*

Be it known that I, AUGUSTUS A. BALL, Jr., a citizen of the United States, residing at Lynn, in the county of Essex, State of Massachusetts, have invented certain new and useful Improvements in Fluid-Pressure Engines, of which the following is a specification.

It is of the utmost importance in engines of small size, and particularly those intended for automobiles, to so arrange the parts that they are accessible. To put the matter in another way, the engine and the driven parts must be so arranged with respect to the engine itself, and also with respect to the vehicle, that adjustments and renewals can be made without disturbing the regulators, piping and other devices. The latter is a most important consideration, for while an engine of itself may be fairly accessible as to its parts it frequently happens that when the engine is on a vehicle it can not be adjusted or repaired without taking down or disconnecting a large number of the working parts, piping, etc. It is also of the utmost importance to provide an engine which is economical in its operation, since the vehicle can carry only limited supplies of fuel and water. To those operating steam propelled vehicles the inconvenience of stopping for water is at times very great, and anything which tends to save water and fuel is advantageous. Again, the more economical the engine the smaller will be the cost of operation, hence any saving in the use of steam, no matter how small, directly favors the operator.

My invention has for its object to improve and simplify the construction of small engines.

It furthermore has for its object to provide an engine which is reliable and economical in its operation.

In the accompanying description and claims appended thereto is set forth what I consider to be novel and my invention.

In the drawings which illustrate one embodiment of my invention.

Figure 1:
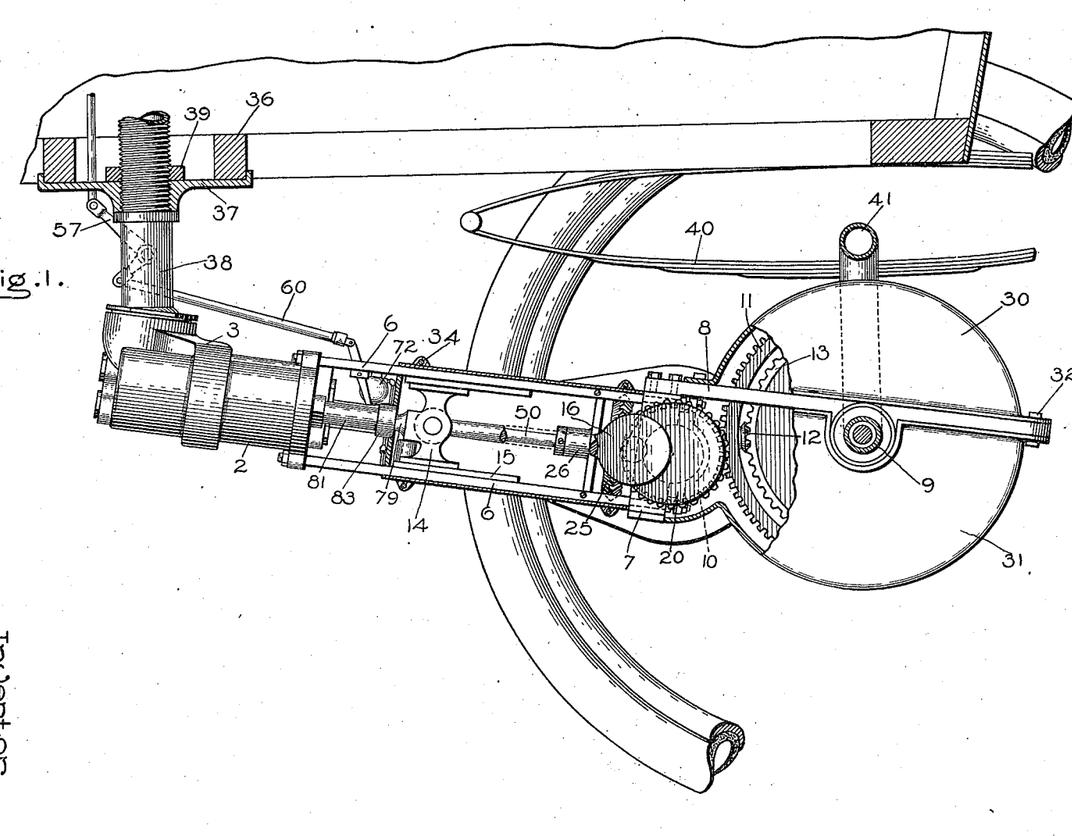
Figure 1 is a side elevation of the engine mounted on a vehicle, with certain of the engine parts broken away for the purpose of illustration.
Figures 2, 3, 4, 5, 27, 28:
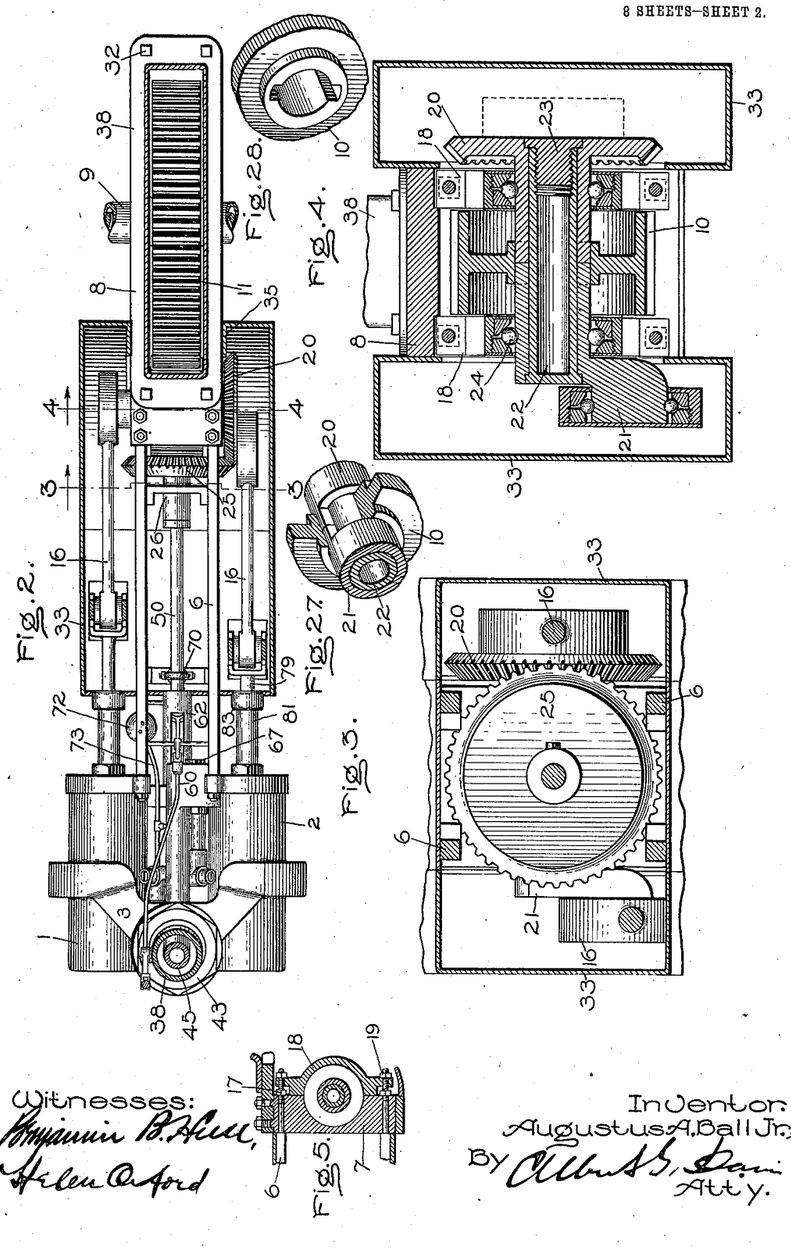
Fig. 2 is a plan view of the engine with a part of the casing in section.
Fig. 3 is a sectional view taken on line 3 3 of Fig. 2 looking in the direction of the arrow.
Fig. 4 is a cross-section taken on line 4 4 of Fig. 2 looking in the direction of the arrow.
Fig. 5 is a detail view in cross-section of one of the main crank bearings.
Fig. 27 is a perspective view of the crank-shaft and pinion broken away to illustrate the means of connecting them.
Fig. 28 is a perspective view of the pinion broken around the hub showing the slots in which the tongues on the crank-shaft are held.
Figure 6:
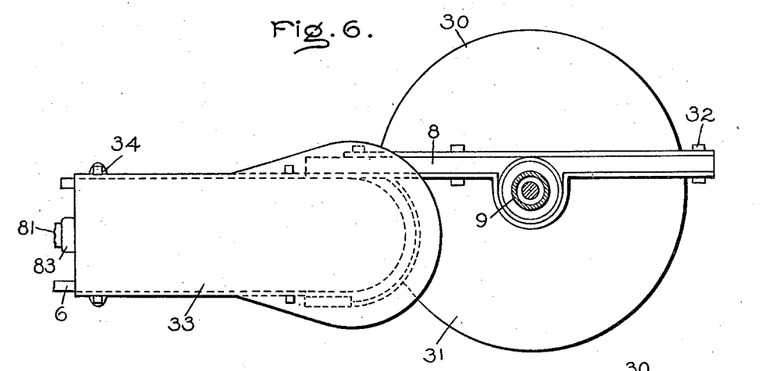
Fig. 6 is a side elevation of the engine and gear casings.
Figures 7, 8:
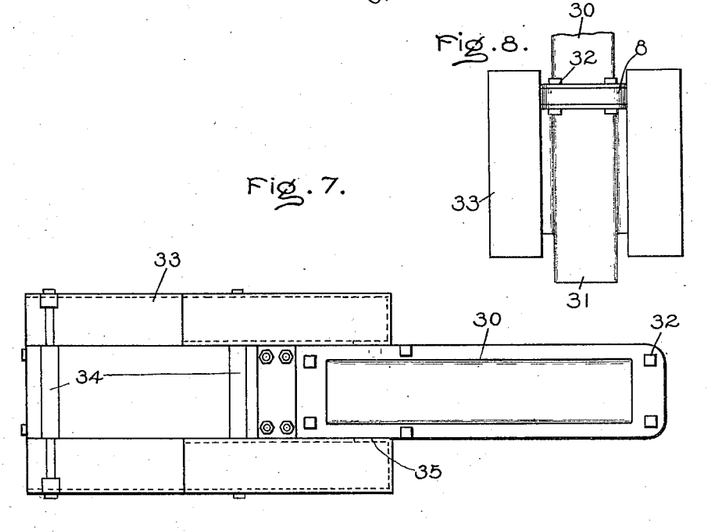
Fig. 7 is a plan view of the same.
Fig. 8 is a partial end elevation as viewed from the rear of the vehicle.

Referring more particularly to Figs. 1 to 8, inclusive, 1 and 2 represent the cylinders of the engine which are united by the support 3. This support, in addition to uniting the cylinders and supporting one end of the engine, conveys exhaust therefrom. The cylinders, of which two or more may be used, are further united by the steam-carrying connections 4 and 5, Fig. 17. The valve mechanism, to be hereinafter referred to, is also carried by the engine cylinders and I find it advantageous to cast these parts as a single unit because it decreases the liability of the parts getting out of line, and it also simplifies the machine work. The construction also enables me to make the parts more compact. The end of the cylinders adjacent to the crank-shaft are provided with enlargements in which are seated four frame bars, 6. Each of these bars is secured to the engine by a screw-thread and nut, although other means can be employed if desired. The bars extend parallel with respect to each other and are united at the opposite end by the divided bearing block 7, which block is in turn bolted to the axle yoke 8. The yoke is suitably supported in bearings on the tubular axle 9, and serves at all times to hold the parts in fixed relation. Mounted on the main shaft of the engine is a pinion 10 which meshes with the spur gear 11 of the differential. The spur gear carries a number of pinions 12 which mesh with the bevel gears 13 in such manner that the engine can drive the vehicle, at the same time permitting the driving wheels to move independent of each other, as in following the path of a curve. Each cylinder is provided with a piston which is connected to a cross-head 14, the latter being adapted to move on guides 15 that are carried by the frame. Between each cross-head and the crank-shaft is a connecting rod 16, which is preferably, although not necessarily, provided with a ball-bearing at the point of union with the crank. The frame bars 6 are situated between the cross-heads and directly in line with the axle yoke 8, so as to hold the parts in rigid alinement. This arrangement is desirable because it renders the moving parts accessible, and this without disturbing any of the adjustments. The means employed to secure the frame bars to the divided main bearing block are best shown in Fig. 5. The end of each frame bar 6 is provided with a screw-threaded portion, and nuts 17 are employed to clamp the sections of the bearing blocks against the shoulders on the rods. One section of the block is held by one pair of frame bars, and the other is held by the second pair. I find it desirable to employ detachable ball-bearings for the crank-shaft and these bearings are retained in place by detachable caps 18. Each cap is held in place by nuts 19 which engage the screw-threaded ends of the frame bars 6. By such an arrangement the bearing caps can be removed without in any way disturbing the frame bars, and consequently the alinement is always preserved. Furthermore, by utilizing the screw-threaded ends of the frame bars, I am enabled to dispense with extra bolt holes and, consequently, with extra small parts. When the caps are removed the ball-bearings as a whole can be removed if desired.

The construction of the crank-shaft and its bearing is best shown in Fig. 4. The crank-shaft is made in two parts, one of which is secured to the bevel gear 20 and its attached crank, while the other is secured to the crank 21. Each of the adjacent faces of the shaft is provided with a tongue, and the tongues thus formed make a butt joint as illustrated in Fig. 27. The two parts of the shaft are held together by means of a tubular bolt 22 which is provided with a head on one end and is screw-threaded at the other. Engaging with the threaded portion is a nut 23, by means of which the two parts of the shaft are drawn together and firmly secured. The periphery of the shaft is hardened, and engaging therewith are rows of balls 24, suitable adjusting and retaining means being employed. Situated between the sections of the main bearing block is a sleeve 10 which surrounds the tongue-like ends of the main crank-shaft and prevents them from moving angularly with respect to each other. It is to be noted that the sleeve is so shaped that it closely surrounds the tubular bolt 22 and also fills in the segmental cut-away portions of the crank shaft when the parts are assembled. In the present instance the sleeve has the additional function of driving the axle gear, and to this end teeth are cut thereon which mesh with the driving gear. By reason of this construction the two parts of the crank are keyed together by the sleeve or pinion, yet the pinion can readily be removed by separating the parts of the bolt 22. With an ordinary key between the crank-shaft and the pinion it would be necessary to remove one or both of the sections of the bearing block and at least two of the frame bars, but by reason of the construction described this objection is entirely obviated and generous bearing and wearing surfaces are provided. It will be noted that the bearings are situated between the pinion and the driving cranks, which reduces the strains on the frame to a minimum. The bevel gear 20 meshes with a corresponding gear 25 which drives the cam-actuating mechanism to be hereinafter described, and is suitably mounted in a bearing 26.

The engine being particularly designed for automobile service, it is important that a suitable casing be provided for the working parts so as to exclude dust and dirt therefrom. I have provided a sectional case of novel construction which can readily be detached from the engine and other working parts whenever it becomes necessary to inspect the same. The casing is made in sections for convenience in assembling and handling. It also has the advantage of permitting one or more of the smaller parts to be inspected without removing many bolts or other retaining devices. The upper half of the driving gear is covered by a thin casing 30 which may be made out of sheet metal or cast out of some light material such as aluminum, for example. It is provided with a flange that engages with the axle yoke. The lower half of the driving gear is protected by a sheet or cast metal casing 31, bolted to the under side of the axle yoke. It will be found convenient to extend the retaining bolts 32 through the flanges on both parts of the casing, and also through the axle yoke, since by so doing the holding of the casing parts is simplified. Surrounding each of the cross-heads and its connecting rod is a detachable casing 33, which has parallel sides for a portion of its length, while the other portion comprises a curved enlargement that is arranged to inclose the rotating crank. The parts of the casing rest directly on the frame bars 6, and are held in place and prevented from separating by the bolts 34, Figs. 1 and 7. In all, four of these bolts are provided, two being located above the upper frame bars and two underneath the lower frame bars. The gear end of each of these casings is provided with an in-turned end 35 which engages with the sides of the lower gear casing 31. The object of this arrangement is to provide a firm support or bearing. It also acts as a receptacle to receive oil, so that the crank may be lubricated as it revolves. Situated above and also below the frame bars are flat metal plates which form the top and bottom of the splash-case for the engine. It is also intended to lubricate the bearing by a lubricating fluid contained in the casing. The fluid is also used for lubricating the engine cylinders and for actuating the valves.

Reference will now be made to the novel means employed for supporting the end of the engine and also for conveying steam to and from the cylinder.

36 represents the frame-work of the body of the vehicle, and fastened thereto is a perforated plate 37 that is arranged to receive the tubular support 38. The support is screw-threaded at its upper end and is also provided with a shoulder. By adjusting the nut 39 the plate 37 may be rigidly clamped against the shoulder, thus preventing the tubular support from moving up and down independent of the body. The vehicle body is supported by springs 40, which are carried from the arched member 41 forming a part of the rear axle. By reason of this construction the engine is in a measure spring supported, hence the shock to the moving parts is greatly reduced. The yoke 8 holds the gears in alinement so that the pitch relation is always preserved. The wheels are preferably provided with elastic tires so as to reduce vibration.

Figure 9:
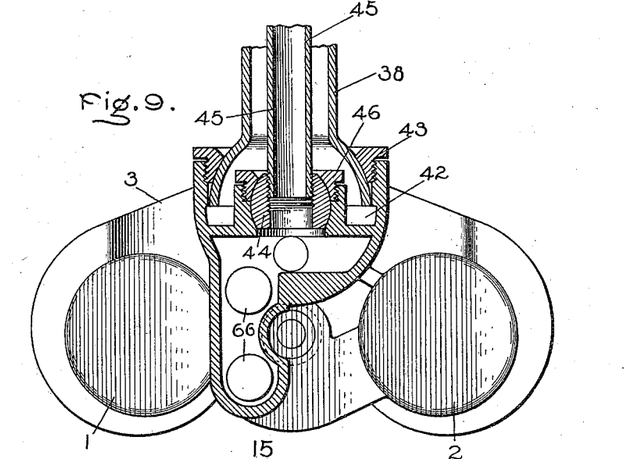
Fig. 9 is a vertical section taken through the engine support and steam and exhaust carrying connection.

In Fig. 9 the support for the engine is shown on a somewhat enlarged scale. The lower end of the tube 38 is expanded to form a section of a sphere. This spherical section is seated in a cup 42 that is formed on the engine body. In the specific illustration the cup is formed in the bridge-like connection which unites the cylinders and carries the exhaust steam. The upper end of this cup-like receptacle is screw-threaded and provided with a nut 43 having a spherical face which engages with the spherical surface on the tubular support. By reason of the spherical construction of the parts the vehicle body is free to move independent of the engine to a certain extent without causing undue strains, and the steam joint between the parts is always maintained. In addition to acting as a support for the engine, the tubular support 38 conveys the exhaust steam to some convenient place. The bottom of the cup is provided with an upwardly-extending hub-like portion which is closely fitted to the segmental sphere 44 that is carried by the end of the steam pipe 45. The ball or sphere 44 is closely fitted to the base, and the retaining nut 46 is provided to hold the same in place. The pipe 45 is connected with a suitable source of steam supply, and is arranged to carry steam to the supply or admission valves as will hereinafter appear. It is to be noted that the ball 44 and the spherical enlargement of the support 38 have the same center, so that when the body and engine move with respect to each other the support and connection will not be subjected to undue strains. In order that the steam-carrying connection and the support be firmly secured in place it is necessary to provide means for preventing perpendicular movement of one independent of the other. Such a means is found in Figs. 23 and 24. In these figures a collar 47 is provided on the steam connection and engaging therewith are projections 48 formed on the tubular support 38. These projections act as a fixed abutment, so that when the adjusting nuts are screwed into place the bearing surfaces will be in firm contact.

Figure 25:
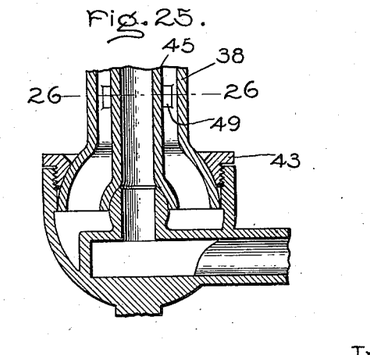
Fig. 25 is a vertical section of a modified form of the engine support.
Figure 26:
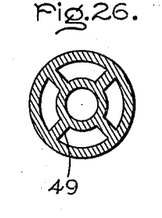
Fig. 26 is a sectional view taken on line 26—26 of Fig. 25.

In Figs. 25 and 26 is shown a slight modification of this feature of my invention, wherein the support 38 and the steam-carrying connection 45 are formed integral and are suitably braced, as at 49. In this modification the adjusting nut 46 for the steam connection has been dispensed with, and the nut 43 is depended upon to retain both of the parts in place. In this modification, as in the structure first described, the steam-carrying connection and the support are provided with spherical surfaces which engage with corresponding spherical surfaces, all of which have the same center. By reason of this connection the engine and its connecting parts are free to move to a certain extent independent of the support on the carriage body. The construction shown in Fig. 9 has the advantage over the one shown in Fig. 25 in that a slight amount of independent adjustment of the support and steam-carrying connection is permitted.

Figures 13, 14, 15:
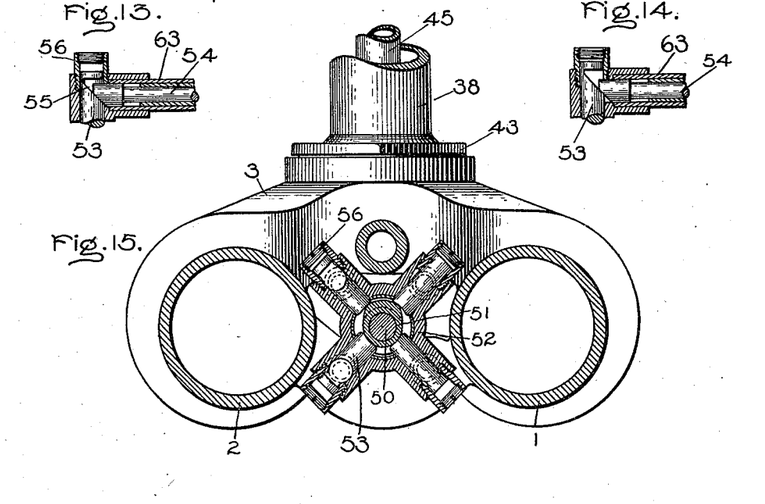
Fig. 13 is a detail view of a part of the valve mechanism showing the valve in a closed position.
Fig. 14 is a detail view of a portion of the valve mechanism showing the valve in the open position.
Fig. 15 is a cross-section of the engine and valve actuating mechanism taken on line 15 15 of Fig. 10 looking in the direction of the arrow.

The valve-actuating mechanism will now be described. The engine being of the double acting type, it is necessary to provide a valve mechanism capable of admitting steam, first to one end of the cylinder and then to the other. The engine is so constructed that steam is admitted at the extreme end of one of the cylinders, then sweeps toward the middle of the cylinder (considered with respect to its length), where it discharges through exhaust ports which are covered and uncovered by the movements of the piston. The cylinder is of such length and so related to the piston, and the exhaust ports are so positioned, that the same piston and same set of exhaust ports suffice for both forward and backward movement. The admission valves, of which there are four, are of the puppet type and are actuated by a novel means. The bevel gear previously described in connection with Figs. 2 and 4 drives the cam-actuating shaft 50, which shaft is suitably supported in bearings near the gear, and also by bearings carried by the engine cylinders. Mounted on the shaft is a cam 51 (Figs. 15 and 17) of such shape that it will alternately open the valves in the proper sequence. The mechanism for operating each of the puppet valves is similar, so that a description of one will be sufficient. Formed integral with the engine cylinders is a support 52, having four radially extending arms, each of which is provided with a cylindrical bore, and mounted therein is a plunger 53 (Figs. 13, 14, 15) having one end arranged to be acted upon by the revolving cam 51, and the other end arranged to act upon the stem 54 of the puppet valve. The character of the end of the plunger 53 is well shown in Fig. 13. It will be seen that it is provided with a beveled or cam end 55 which engages with the corresponding beveled end of the valve stem. When in the position shown in Fig. 13 the puppet valve is closed, but when the plunger 53 is forced outward by the cam 51, as is indicated in Fig. 14, it moves the valve stem longitudinally in a manner to cause it to open the puppet valve. The ends of the projecting arms are screw-threaded to receive the plug 56. It is to be noted that the arms of the support are so located with respect to the cylinders that they may be readily bored in an ordinary drill press, and this without special appliances.

Figures 17, 18, 19, 20:
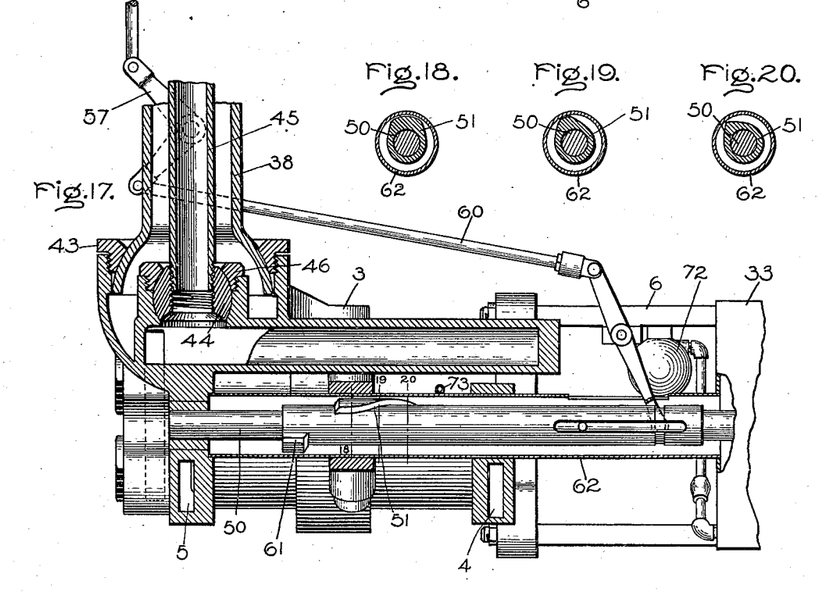
Fig. 17 is a longitudinal section taken on line 17—17 of Fig. 10 looking in the direction of the arrow.
Figs. 18, 19 and 20 are detail views in cross-section of the cam employed to actuate the valve mechanism, which sections are taken respectively on lines 18, 19 and 20 of Fig. 17.
Figure 21:
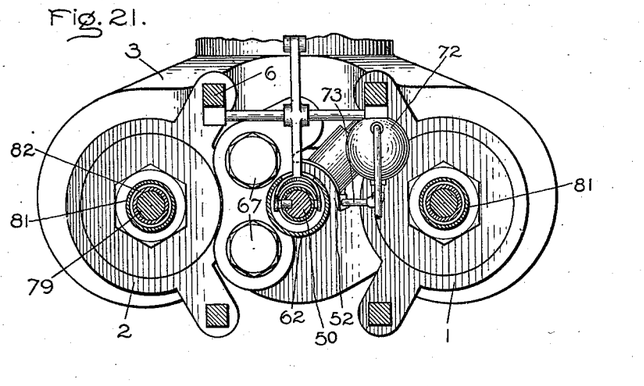
Fig. 21 is a view of the cylinder end of the engine in elevation as viewed from the main crank, with certain of the parts in section, the section being indicated by line 21, Fig. 23.

The cam 51 is splined on the cam shaft 50, as shown in Fig. 17, and is intended to be moved longitudinally by a system of levers 60, as shown in Figs. 1 and 17. By adjusting the position of the cam the period of admission can be adjusted at will, and by moving the cam to a point where the projection 61 engages with the valve-actuating devices the engine may be reversed. The actuating cam, as well as the sleeve to which it is secured, is inclosed by a sheet-metal casing 62, with the exception of the small opening designed to admit the actuating lever. In practice this opening is practically covered, but for the purpose of illustration in this case it has been shown as being somewhat large, see Fig. 10. The fork which engages with and moves the cam is pivotally mounted in a bearing carried by the frame bars 6, and the bell-crank lever 57 is pivoted on the tubular support 38.

Figure 10:
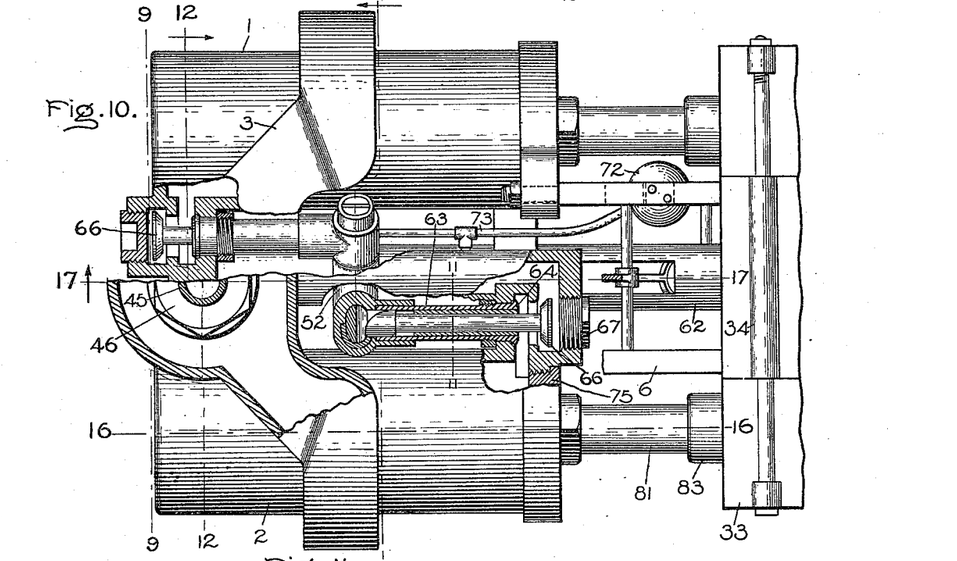
Fig. 10 is a plan view of the engine cylinders with parts of the valve mechanism in section.
Figure 11:
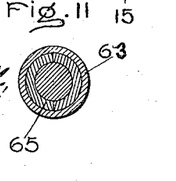
Fig. 11 is a cross-section of one of the packings for the puppet valves, the section being taken on line 11 11 of Fig. 10.
Figure 12:
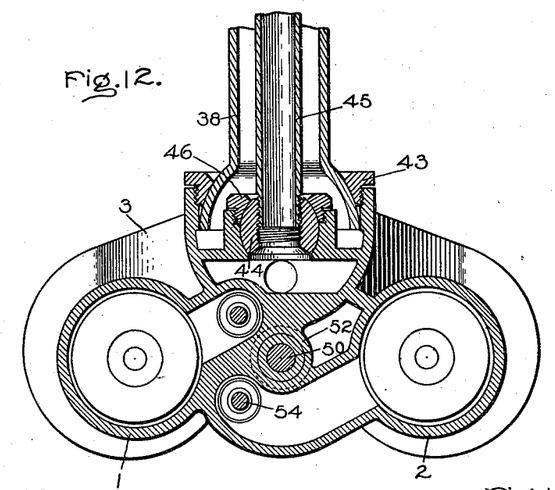
Fig. 12 is a cross section of the engine and valve mechanism taken on line 12—12 of Fig. 10 looking in the direction of the arrow.

Since the engines are of the double acting type, it is necessary to provide valves for admitting steam to the engine at opposite ends. To accomplish this the valve-actuating mechanism is placed at a point midway between the ends of the cylinders, as is shown in Fig. 10, and the valve-actuating stems are extended in opposite directions. By this arrangement I am enabled to use valve stems which are of exactly the same construction, and which are interchangeable. This also applies to the packing and other small parts. A further advantage of the means shown resides in the decreased length of the steam-carrying passages, which passages are relatively free from bends. Each of the four arms extending outwardly from the support 52 is provided with a hub-like projection to receive the tube 63, Fig. 10, which incloses the valve stem 54 and acts also as a packing. The tube is provided with an enlarged head 64 which is seated on a shoulder formed on the engine casing, and is normally held in place by a nut. Situated between the tube and the valve stem is a divided metal bearing sleeve 65, Fig. 11. It is to be noted (Figs. 10 and 23) that the sleeve 65 is separated at the end by a space from the enlarged cam head on the valve stem. The object of this space is to receive oil under pressure for the purpose of assisting to close the valves, as will hereinafter appear. The valve stems are attached to puppet valves 66, which are so positioned with respect to the main cylinders that, in event of the back pressure exceeding a predetermined amount, they will open and permit the confined vapor to enter the supply pipe. These valves are inserted in place through openings formed in the casing, after which the screw-threaded plugs 67 are mounted in place. The area of the under side of the puppet valve being less than the area of the head, the valves always have a tendency to close under the steam pressure, but in order to insure their closing whether pressure is exerted upon them or not, it is necessary to provide separate means. In usual constructions springs are employed to close the valves but these are objectionable for several reasons: First, they are liable to lose their temper; second, they require inspection; and third, they are of necessity located at a somewhat inaccessible point, thus requiring that more or less of the engine and vehicle parts be taken down to get at them.

Figure 22:
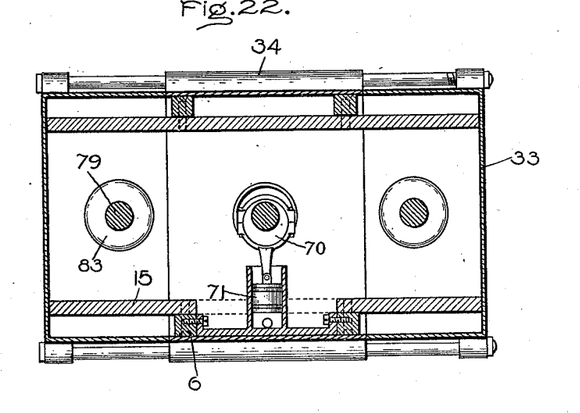
Fig. 22 is a cross-section taken on line 22 of Fig. 23.
Figure 23:
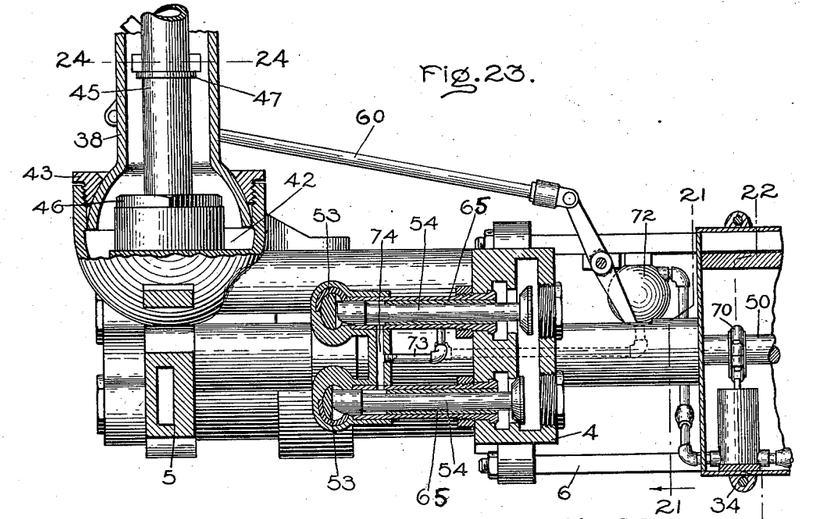
Fig. 23 is a longitudinal section of the engine taken through the puppet valves.
Figure 24:
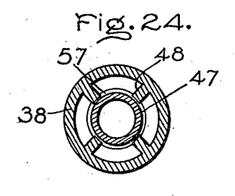
Fig. 24 is a cross-section taken on line 24—24 of Fig. 23.

Referring more especially to Figs. 2, 22 and 23, the novel means employed to assist in the closing of the valves and also to lubricate the pistons will be described. Mounted on the cam-shaft 50 is an eccentric 70, Fig. 22, which, through an eccentric strap, drives the pump piston 71. This pump is arranged to draw oil from the engine case and supply it under pressure to the tank or receptacle 72, the latter containing more or less air under pressure. From the tank extends a pipe 73 which opens into the passage 74, Fig. 23, between the two valves acting on the right hand end of the cylinders, and into a corresponding passage opening into the stems controlling the puppet valves on the left hand end of the engine, Fig. 1. Inasmuch as the action is similar in both cases, a description of one of them will be sufficient. As the plunger 53 moves outward under the action of the cam it causes the valve stem 54 to move to the right and open a puppet valve; such a condition is shown in Fig. 23. It is to be noted that the cam or head is somewhat larger than the valve stem and that the head makes a working fit with the outer sleeve or tube 63. This leaves a space between the head and the end of the split sleeve 65, which space is in communication with the fluid-containing passage 74. The passage 74 is normally filled with a non-elastic fluid such as oil under considerable pressure, and as the plunger 53 recedes under the action of the main driving cam 51, the pressure exerted by the oil on the enlarged head of the valve stem is sufficient to cause it to move longitudinally and close the valve. This action is of course assisted by the action of the steam on the head, but in event of the steam pressure being cut off, the fluid pressure, due to the pump and air-containing tank 72, the latter acting as a cushioning device is sufficient to cause the valve to close. As the main cam progressively opens the puppet valves and releases them the oil and steam pressure acting together will close them; the cam always insuring the proper sequence. As the valves are actuated by the oil under pressure, enough will leak between the stem and the inclosing sleeve to lubricate the pistons, and any oil leaking around the plungers will be caught by the tube 62 and conveyed to the engine casing. In this manner the lubricant is used over and over again.

Figure 16:
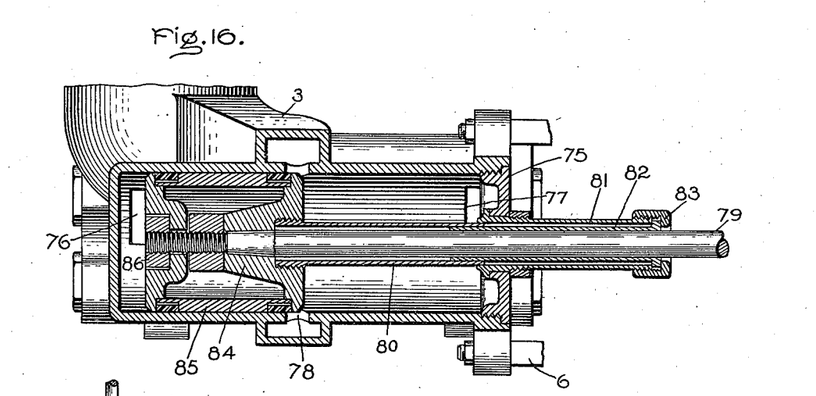
Fig. 16 is a longitudinal section of one of the engine cylinders taken on line 16—16 of Fig. 10.

Referring to Fig. 16, the construction of the engine pistons and the packing will be described. Each cylinder has one end formed integral with its cylinder walls, and one screw-threaded detachable head 75. On opposite ends of the cylinder are inlet ports 76 and 77, and at a point midway between the ends of the cylinder are exhaust ports 78, which are covered and uncovered by the movements of the piston itself. The piston is provided with packing rings, and is secured to a piston rod 79. Surrounding the piston rod and separated therefrom by a space is a sleeve 80 which passes between two sleeves 81 and 82. The former is carried by the cylinder head 75 and is rigidly secured thereto by means of an enlarged shoulder and retaining nut. The outer end of the tube is screw-threaded, and mounted thereon is a nut 83 which serves to clamp and hold the sleeve 82 in place. The sleeve 82 is intended to make a good working fit with the piston rod. As the sleeve 80 moves back and forth between the sleeves 81 and 82, it serves to prevent steam from escaping around the piston rod by reason of the tortuous passage, thus increasing the distance which has to be covered by the escaping steam before it can pass to the atmosphere; also, owing to the reduction in temperature between the inside and the outside of the cylinder, I have found that the steam will condense and the water, due to condensation, will prevent the steam from escaping around the piston rod, and this without undue wearing of the parts. The construction is of great importance because one of the greatest difficulties in connection with steam-actuated apparatus is to keep the packings tight.

In addition to acting as a part of the packing the tube or sleeve 80 protects the piston rod from the effects of the incoming steam, so that the latter may be given any desired degree of superheat. The piston also embraces certain novel features in construction. The end of the piston rod is slightly tapered, and seated thereon and retained in place by a nut is a shouldered head 84. Facing this head is a second which is also shouldered and is retained in place by a nut 86. Between the shoulders is a cylinder 85 having ends of reduced cross-section arranged to receive the packing rings. The rings are of any suitable kind, and are held between the shoulder on the cylinder and the heads. By releasing the nut 86 the packing rings and cylinder 85 can be removed.

I do not claim here the construction and arrangement of the vehicle frame because that forms the subject-matter of my co-pending application, Serial No. 110,317, filed June 5, 1902 (now Patent No. 725,394).

In accordance with the provisions of the patent statutes I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,

1. In combination, a cylinder, a plurality of frame bars secured thereto, a bearing block supported thereby, an axle yoke which is secured to the block, a two-part detachable gear casing that is mounted on the yoke, and a detachable casing which incloses the frame bars.

2. In a multi-cylinder engine, the combination of a plurality of cylinders, a frame secured to the cylinders, a pair of connecting rods, separate detachable casings which are attached to the frame and inclose the connecting rods, a gear which is connected with the rods and is situated between them, and a casing for the gear which engages the connecting-rod casings and is separable therefrom.

3. In an engine, the combination of a piston and cylinder, a frame, inclosing plates which are supported by the frame, connecting rods, and separate detachable casings which inclose the rods and are held in engagement with the inclosing plates.

4. In combination, a piston and cylinder, a frame, a driving gear mounted thereon, a driven gear, an inclosing casing for the driven gear, a connecting rod between the driven gear and the piston, and a detachable casing for the rod which engages with the frame and the inclosing casing.

5. In combination, a piston and cylinder, frame-bars, a driving gear, an inclosing two-part casing for the driven gear, plates inclosing the frame bars, connecting rods between the piston and the driving gear, and separate detachable casings for the rods which engage with the plates and the casing for the driven gear, and retaining means for securing the several case sections in place.

6. In an engine, the combination of a pair of rigidly united cylinders, a divided main bearing block, and a plurality of detachable frame bars secured to each part of the main bearing which unite said part with the cylinder.

7. In an engine, the combination of cylinders situated side by side and integrally connected, pistons therefor, a crank shaft, a divided bearing block for the shaft, frame-bars attached to the cylinders and the parts of the bearing block, a gear situated between the parts of the block, connecting rods secured to the pistons and to the crank shaft and situated on opposite sides of the gear and outside of the parts of the bearing block, and an axle yoke which unites the parts of the bearing block.

8. In an engine, the combination of a pair of cylinders situated side by side, radially disposed valves for admitting steam to the cylinders, a driving pinion which is mounted on the crank shaft, a pair of connecting rods which are connected to the shaft on opposite sides of the gear, a cam driving shaft situated between the cylinders and the connecting rods for operating the valves, and gearing between the crank and driven shaft.

9. In an engine, the combination of a pair of integrally formed cylinders, a divided main bearing block, a gear situated between the divisions, a crank and separate detachable frame pieces which hold the bearing block in rigid alinement with the cylinders.

10. In combination, a cylinder, a pair of frame bars having threaded ends, a bearing block secured to said ends, and caps for the blocks which are also mounted on said screw threaded ends.

11. In combination, a piston and cylinder, frame bars secured to the cylinder and provided with threaded ends, a bearing block mounted on said ends, a detachable bearing in the block, and a cap for the bearing which is also mounted on and secured to the threaded ends of the frame bars.

12. In an engine, the combination of a cylinder, a piston and rod, a sleeve carried by the piston which surrounds the rod and prevents the hot steam from striking it, and a packing for the rod.

13. In an engine, the combination of a cylinder, a piston and rod, a sleeve carried by the piston which surrounds the rod and protects it from hot steam, a cylinder head, and a pair of tubes carried thereby, one of which is greater and the other less in diameter than the sleeve, whereby the tubes and sleeve are permitted to telescope as the piston travels.

14. In an engine, the combination of a cylinder, a head therefor, a tube or sleeve mounted on the head, a second tube mounted within the first and separated therefrom by a space, a nut for clamping the tubes together, a piston, a piston rod which makes a working fit with the second tube, and a sleeve which is secured to the piston and enters the space between the tubes, substantially as described.

15. In a double-acting engine, the combination of admission ports located at opposite ends of the cylinder, an exhaust port or ports located at a point intermediate the ends and arranged to be covered and uncovered by the piston, a piston rod, and a tube which surrounds the rod and protects it from hot steam.

16. In combination, a plurality of cylinders, a connecting means for uniting the cylinders which also carries the exhaust, a support for the engine, and a pivotal connection between the said means and the support.

17. In an engine, the combination of a plurality of cylinders, an exhaust port at the middle of each cylinder and a chambered means for uniting the cylinders which is formed integral therewith, the said chamber communicating with said exhaust ports situated at a point midway between the ends of the cylinders.

18. In an engine, the combination of a plurality of cylinders, a support, a bridge piece for uniting the cylinders having a cup-shaped receptacle for receiving said support, and a retaining means capable of securing the support in place.

19. In an engine, the combination of a cylinder, a projection formed thereon having a chamber which opens into the exhaust port or ports, a support for the engine which is secured to the projection, and a motive fluid carrying pipe which passes through the support into the chamber and communicates with the passage delivering the fluid to the cylinder.

20. The combination of a cylinder, a projection formed thereon containing a fluid-receiving chamber, a support for the engine which also conveys fluid to or away from the chamber, a second fluid-carrying device which is situated within the first, and means for securing the support and device in place.

21. In an engine, the combination of a piston and cylinder, connections conveying steam to and from the cylinder, one of said connections acting also as a support, and ball-and-socket couplings between the connections and the engine, the two couplings having the same center of motion.

22. In an engine, the combination of a piston, a cylinder having steam and exhaust ports, pipes or connections opening into the independent longitudinal movement, and separately adjustable retaining means for the pipes.

23. In an engine, the combination of a piston and cylinder, concentric tubes for conveying motive fluid to and from the cylinder, projections formed on the tubes which constitute stops or seats, and screw-threaded means for holding the parts in fixed relation.

24. In an engine, the combination of a piston and cylinder, a cam shaft, a valve having a stem which extends parallel with the cam shaft, and cam-actuated devices working at right angles to the shaft for moving the valves.

25. In an engine, the combination of a piston and cylinder, a cam shaft, two or more valves having stems which extend parallel with the cylinder but in opposite direction from the actuating means, and a cam on the shaft which acts on the valves in a manner to cause them to open successively.

26. In an engine, the combination of a plurality of cylinders, a main shaft, a cam shaft extending parallel with the cylinders, a plurality of radially moving plungers, and valve stems extending at right angles to the plungers and parallel with the cylinders.

27. In an engine, the combination of two or more cylinders, a cam shaft, a plurality of radially moving plungers, each plunger being provided with a cam, valve stems which engage with the cams, and outwardly opening puppet valves which are actuated by the stems.

28. In an engine, the combination of a valve support, stems for the valves, a cam and shaft therefor, a plurality of radially acting plungers which engage with the cam on the shaft, cams on the plungers which impart longitudinal movement to the valve stems, and means for changing the period of steam admission by adjusting the position of the cam on said shaft.

29. In an engine, the combination of a cylinder, a support having a main opening and a plurality of radially extending arms, plungers which are guided by the arms, a cam that engages with the plungers and moves them outwardly, a lever for shifting the position of the cam, outwardly opening puppet valves, and stems acted upon by the plungers for opening the valves.

30. In combination, a piston and cylinder, a cam, a shaft for actuating the cam which is mounted on the engine frame and extends parallel with the cylinder, a lever which is supported by the engine, a support for the engine, and a second lever which is pivoted thereto and connected to the first.

31. In a fluid pressure engine, the combination of a piston, a cylinder, a positively opened valve, and means acted upon by a non-compressible fluid under pressure for closing the valve.

32. In combination, a piston and cylinder, a valve, means for positively actuating it in one direction, a source of liquid supply acting under pressure to move the valve in the opposite direction, and an air-containing tank in the supply circuit.

33. In combination, a piston, a cylinder, a valve which is positively moved in one direction, and is moved in the other direction by a source of non-elastic fluid under pressure which is independent of the motive fluid.

34. In combination, a piston and cylinder, a valve which is positively actuated in one direction, and a source of lubricant under pressure for actuating the valve in the opposite direction and for lubricating the piston, substantially as described.

35. In combination, a piston and cylinder, an admission valve which is positively opened, a source of lubricant for closing the valve and lubricating the piston, and a means driven by the piston for subjecting the lubricant to the necessary pressure.

36. In an engine, the combination of pistons and cylinders, a crank shaft, valves for the cylinders, a shaft located between the cylinders and extending parallel therewith, a cam mounted on the shaft, a lever for shifting the cam longitudinally of the cylinders and shaft to change the position of the valves, a crank case, and a casing which surrounds the shaft and opens into the crank case.

37. In an engine, the combination of a cam and its actuating shaft, a closed crank case which contains a lubricant, a slotted tube which surrounds the shaft and opens into the case, and a lever which extends into the slotted tube for moving the cam.

38. In combination, a piston and cylinder, an inclosing casing for the crank shaft containing a lubricant, a valve mechanism, and a pump which receives lubricant from the casing and delivers it against the valve mechanism in a manner to actuate the valve.

39. In combination, a piston and cylinder, a valve controlling the admission of motive fluid to the cylinder, a separate source of fluid supply for actuating the valve, and a means for sustaining said pressure.

40. In combination, a piston and cylinder, a valve, a cam for moving the valve in one direction, a source of fluid supply for moving the valve in the opposite direction, and a means for imparting a pressure to the fluid.

41. In an elastic-fluid engine, the combination of a piston, a cylinder, a valve for admitting elastic fluid to the cylinder, a source of non-elastic fluid for moving the valve, and a cushioning device which is acted upon by the non-elastic fluid.

42. In combination, an engine comprising a pair of cylinders, a bridge-piece for uniting the cylinders, a means attached to the bridge-piece for supporting one end of the engine, an axle, and a yoke which is sleeved on the axle and is attached to the opposite end of the engine and forms a second support.

43. The combination of a yieldingly supported member, a relatively unyieldingly supported member, an engine, a frame for the engine which is pivotally attached to the latter member, and a connection between the engine and the first member which includes a universal joint, and also serves to convey motive fluid.

44. The combination of two relatively movable supports, an engine, a pivotal connection between the engine and one of the supports which permits of a tilting movement about the axis thereof, and a pivotal connection between the engine and the other support which permits of a universal movement, one of said connections forming a fluid conveying conduit.

45. The combination of two relatively movable supports, an engine which maintains a fixed distance between them, and a pivotal connection between each support and the engine, one of said connections forming a fluid conveying conduit.

46. The combination of two relatively movable supports, a multi-cylinder engine between them, a cored bridge-piece uniting the cylinders and through which fluid is conveyed, a pivotal connection between the bridge piece and one of the supports, and a second pivotal connection between the other support and another part of the engine.

In witness whereof, I have hereunto set my hand this 21st day of June, 1902.

AUGUSTUS A. BALL, Jr.

Witnesses:
DUGALD McK. McKILLOP,
JOHN A. McMANUS.

Copies of this patent may be obtained for five cents each, by addressing the "Commissioner of Patents, Washington, D. C."